US007014692B2

(12) United States Patent
Nilsson et al.

(10) Patent No.: US 7,014,692 B2
(45) Date of Patent: Mar. 21, 2006

(54) SCRUBBER

(75) Inventors: Mikael Nilsson, Bromma (SE); Tryggve Hemmingsson, Sollentuna (SE)

(73) Assignee: Aerocrine AB, Solna (SE)

( * ) Notice: Subject to any disclaimer, the term of this patent is extended or adjusted under 35 U.S.C. 154(b) by 156 days.

(21) Appl. No.: 10/664,274

(22) Filed: Sep. 16, 2003

(65) Prior Publication Data
US 2004/0082873 A1 Apr. 29, 2004

(30) Foreign Application Priority Data
Sep. 16, 2002 (SE) .................................. 0202741-5
Oct. 2, 2002 (SE) .................................. 0202905-6

(51) Int. Cl.
*B01D 53/04* (2006.01)
*B01D 53/56* (2006.01)

(52) U.S. Cl. ............................. 96/135; 95/129; 96/139; 96/147; 96/153; 96/154; 55/518; 55/DIG. 33; 423/239.1

(58) Field of Classification Search .................. 95/128, 95/129; 96/108, 139, 131–135, 147, 153, 96/154; 55/516–519, DIG. 33, DIG. 35; 423/235, 239.1
See application file for complete search history.

(56) References Cited

U.S. PATENT DOCUMENTS

| | | | | |
|---|---|---|---|---|
| 1,499,864 A | * | 7/1924 | Gordon | 55/484 |
| 1,610,288 A | * | 12/1926 | Jones et al. | 423/524 |
| 1,789,194 A | * | 1/1931 | Rockwell | 423/236 |
| 2,621,753 A | * | 12/1952 | Urdah | 96/117.5 |
| 2,744,523 A | * | 5/1956 | Malcom, Jr. et al. | 128/206.17 |
| 2,951,551 A | * | 9/1960 | West | 96/133 |
| 3,090,490 A | * | 5/1963 | Yocum | 210/299 |
| 3,854,912 A | * | 12/1974 | Terrel et al. | 96/134 |
| 3,929,966 A | * | 12/1975 | Okabe et al. | 423/239.1 |
| 3,944,403 A | * | 3/1976 | Simpson et al. | 96/131 |
| 4,177,048 A | * | 12/1979 | Rivers et al. | 96/117.5 |
| 4,326,514 A | * | 4/1982 | Eian | 128/202.22 |
| 4,385,911 A | * | 5/1983 | Popeil et al. | 96/131 |
| 4,530,706 A | * | 7/1985 | Jones | 96/117.5 |
| 4,637,408 A | * | 1/1987 | Rainer et al. | 131/331 |
| 4,683,862 A | * | 8/1987 | Fornuto et al. | 123/520 |
| 4,684,380 A | * | 8/1987 | Leichnitz | 96/117.5 |
| 4,915,922 A | * | 4/1990 | Filss | 423/239.1 |
| 4,986,839 A | * | 1/1991 | Wertz et al. | 96/136 |
| 5,022,901 A | * | 6/1991 | Meunier | 96/134 |
| 5,158,077 A | * | 10/1992 | Sundstrom | 128/205.27 |
| 5,169,419 A | * | 12/1992 | Mori et al. | 96/117.5 |
| 5,288,469 A | * | 2/1994 | Skalla | 422/171 |
| 5,478,377 A | * | 12/1995 | Scavnicky et al. | 96/17 |

(Continued)

FOREIGN PATENT DOCUMENTS

WO WO 01/26547 4/2001

*Primary Examiner*—Robert H. Spitzer
(74) *Attorney, Agent, or Firm*—Morrison & Foerster, LLP

(57) ABSTRACT

A scrubber for eliminating NO from air flowing through the scrubber, comprising a housing (1) having at least one inlet hole (2) and an outlet hole (4) and which is comprising filtering material (6). A second outlet hole (9) is provided in the housing (1) at a position situated at a distance from the first outlet hole (4) and any inlet hole (2) so that the air leaving the second outlet hole (9) will have flown at least through a depth of the filtering material (6) substantially corresponding to the depth of the filtering material (6) for the air flowing from the inlet hole (2) to the first outlet hole (4).

13 Claims, 2 Drawing Sheets

U.S. PATENT DOCUMENTS

| | | | |
|---|---|---|---|
| 5,501,723 A | * | 3/1996 | Andress et al. ............... 96/131 |
| 5,514,205 A | * | 5/1996 | Awaji .......................... 96/152 |
| 6,350,300 B1 | * | 2/2002 | Spiegelman et al. .......... 96/135 |
| 6,692,554 B1 | * | 2/2004 | Leffel et al. .................. 96/108 |
| 6,773,491 B1 | * | 8/2004 | Bohl ........................... 96/130 |
| 2002/0069761 A1 | * | 6/2002 | Fuchs .......................... 96/135 |

* cited by examiner

SCRUBBER

The present invention relates to a scrubber for eliminating a component from air flowing through the scrubber.

TECHNICAL BACKGROUND

Known scrubbers comprise a housing having at least one inlet hole and an outlet hole and comprising filtering material. A scrubber may for example be used in any equipment where for example NO-free air is needed, e.g. for calibration, as in an equipment for measuring the level of nitric oxide in air, especially exhalation air, or any other gas mixture. In such a case a test person inhales air through the scrubber so that NO will be filtered from the air. The air flow may for example be about 1–10 liter/second.

Preferably a return valve is positioned between the inlet/outlet of the equipment, through which inlet/outlet the test person inhales/exhales, and the outlet of the scrubber so that the exhaled air does not pass the scrubber but reaches any sensing portion of the equipment.

When taking a zero reference for the sensing portion of the equipment or making a function control, a small flow of component-free air, for example NO-free air, is used and taken between the outlet of the scrubber and the return valve. One problem with this is that the possibility exists that the zero reference will be mixed with a leakage back flow through the return valve. This would compromise the accuracy of the zero measurement.

This is of course true for any filtering of a component from air. Therefore, it is an object of the present invention to provide a scrubber, which safely makes sure that the zero reference flow actually comes from the scrubber and is identical to the component-free air inhaled by the test person.

SUMMARY OF THE INVENTION

This object is met by a scrubber according to claim 1.

An advantage with this solution is, in the case of a leakage or breakage of a return valve, the depth of the filtering material will still be large enough for filtering the air, making the system safe. This also gives the advantage that the return valve may be an ordinary mechanical one suitable for large flow rates, which is less expensive, instead of an electrically controlled valve needed for handling low flow rates.

Another problem with known scrubbers is that the outlet is designed for large flow rates, which means that there is a large "dead space" in the outlet with air that has been stagnant in this space and the zero reference or function control flow will have to go on for a long time before you may be sure that the air has flown through the scrubber.

According to an embodiment of the present invention this second outlet is smaller than the first outlet, whereby the "dead space" in the second outlet is minimal forming a very effective system where less air needs to flow through the scrubber and the system in order to make sure that a zero reference has been safely registered.

Preferably the scrubber is provided for filtering NO from air.

A problem with known NO-scrubbers is that they comprise carbon filters for the elimination of NO. However, these scrubbers are not suitable for long-term use. They lose their capability of eliminating NO quickly when exposed to humidity even at commonly existent ambient humidity levels. Another drawback is that they need to be voluminous to be able to eliminate NO at high flows and concentrations commonly encountered in urban environments.

Therefore it is also an object of the present invention to provide a small scrubber, which is suitable for long-term use. The solution to this is a scrubber comprising potassium permanganate $KMnO_4$ or potassium permanganate in combination with a suitable grade of carbon. An advantage with this material is that it binds NO and forms manganese dioxide. This retains its filtering capability in moisturous environments, actually better than in dry environments.

SHORT DESCRIPTION OF THE DRAWINGS

The present invention will be described showing an embodiment of a scrubber according to the present invention together with drawings, in which.

DETAILED DESCRIPTION OF A PREFERRED EMBODIMENT

Figure 1:
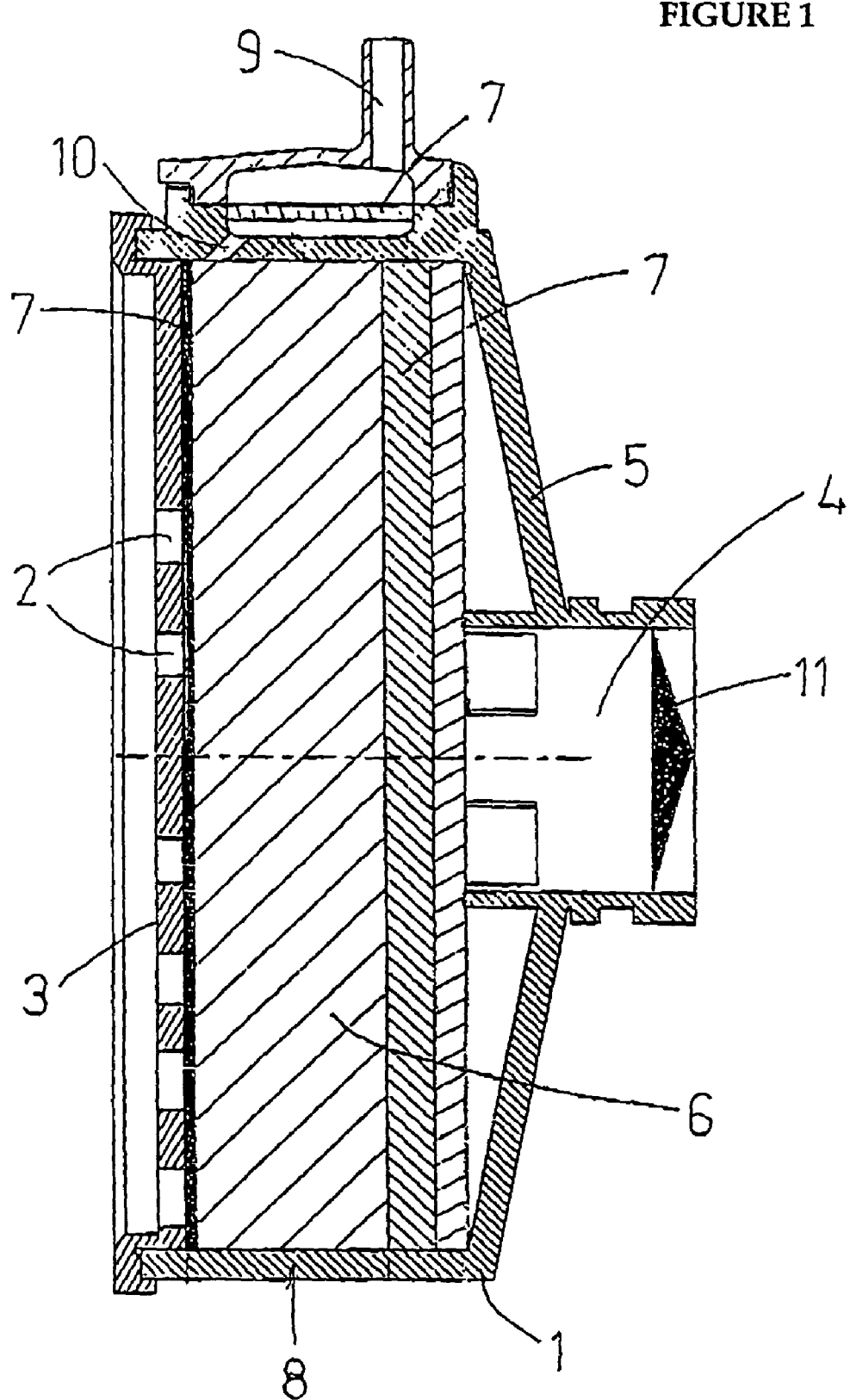
FIG. 1 illustrates a cross section view of an embodiment of a scrubber according to the present invention.
Figure 2:
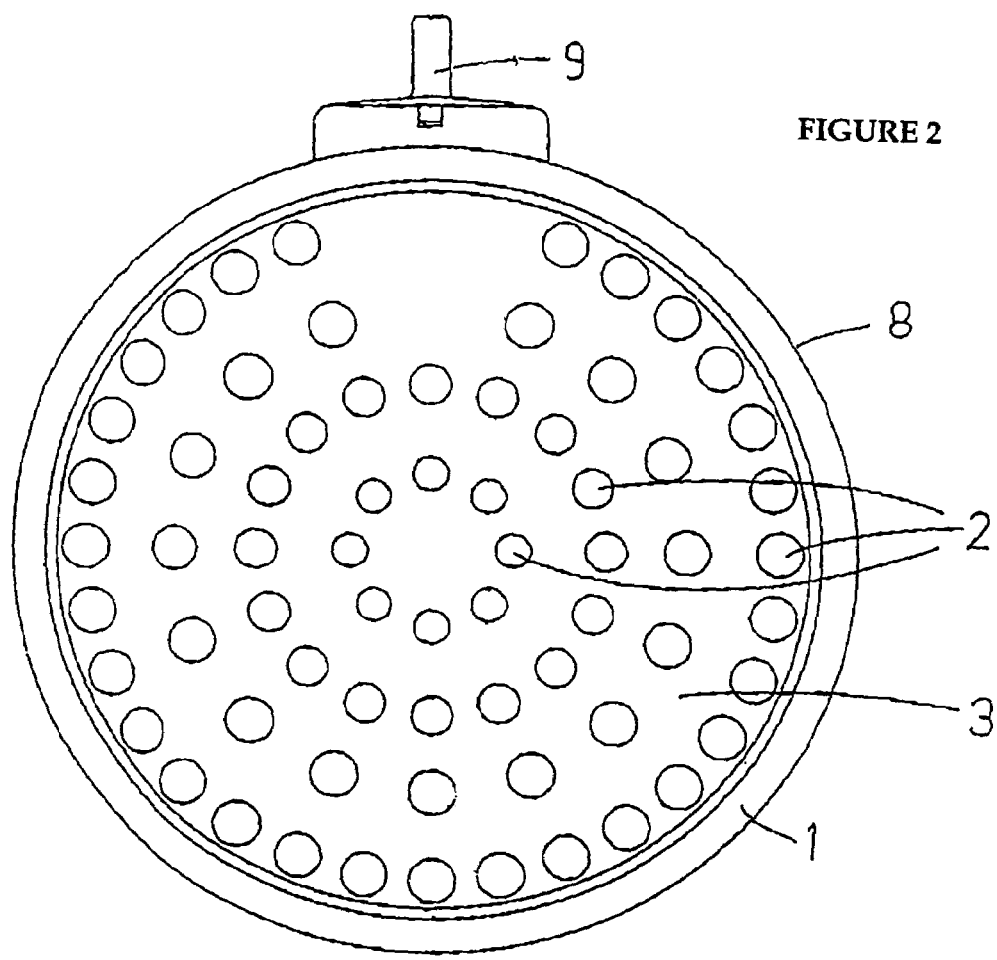
FIG. 2 illustrates the scrubber of FIG. 1 in a view showing an end side having inlet holes.
Figure 3:
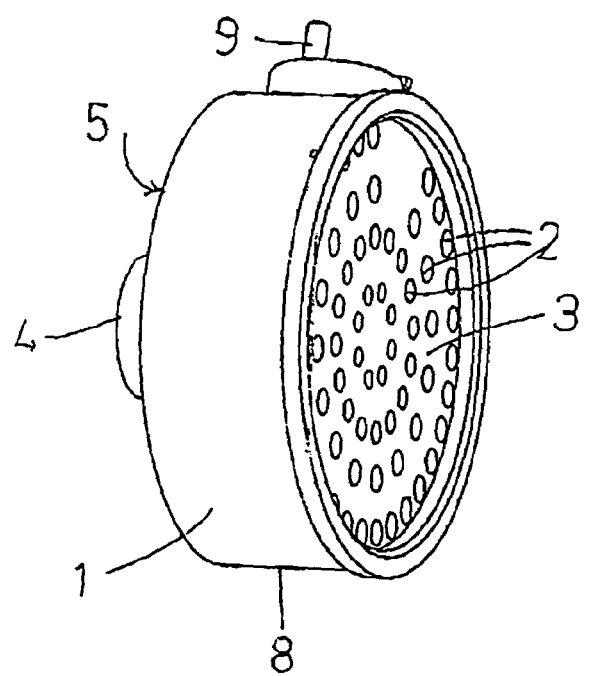
FIG. 3 illustrates the scrubber of FIG. 1 in a perspective view.

The scrubber of the present invention comprises a housing 1 having at least one inlet hole 2, in the shown embodiment several small inlet holes 2 spread over an end side 3, and a first outlet hole 4 in the end side 5 opposite the inlet end side 3. Within the housing 1 is a filtering material 6 present.

Between the housing 1 and the filtering material 6 at the inlet holes 2 and the first outlet hole 4 is a particle filter 7 present to stop particles of the filtering material 6 from leaving the scrubber through the holes 2, 4.

The scrubber of the shown embodiment has a cylindrical wall 8 between the two end sides 3, 5 but of course other shapes are conceivable. At the wall 8 a second outlet hole 9 is present. Also this hole 9 is protected on the inside with a particle filter 7 to stop particles of the filtering material 6 from leaving the scrubber through the second hole 9. In the shown embodiment the air flowing through the filtering material 6 from the inlet holes 2 to the second outlet 9 passes via a channel 10.

The first outlet hole 4 is designed for a throughput of about 1–10 liters/second of air and the second outlet hole 9 is designed for a throughput of about 0.5–50 milliliters/second, preferably.

In order to make sure that the air leaving the second outlet hole 9 has passed a sufficient depth of the filtering material 6, there are not any inlet holes 2 in the inlet end side 3 in the vicinity of the second outlet hole 9. In such way the air must travel a depth in the filtering material 6, for example at least corresponding substantially to the depth for the air to travel between the inlet holes 2 and the first outlet hole 4, making sure that the component, for example NO, will be filtered from the air.

In order to make the air flow from the inlet holes 2 to the second outlet hole 9 and not from the first outlet hole 4 to the second outlet hole 9 a return valve 11 may be arranged in the first outlet hole 4 or outside in the extension of the outlet hole 4.

As a safety measure, in case of leakage in the return valve 11, the second outlet 9 should be provided at a distance from the first outlet valve 4 also. Thus the air must travel a depth in the filtering material 6 at least corresponding substantially to depth for the air to travel between the inlet holes 2 and the first outlet hole 4, making sure that the component, for example NO, will be filtered from the air.

The filtering material 6 is preferably potassium permanganate $KMnO_4$ or potassium permanganate in combination with a suitable grade of carbon in granular form if the component to be removed is NO. The granules may have the size 1/8–1/128 of an inch and preferably 1/32–1/64 of an inch. Preferably the air leaving the scrubber from any of the outlet holes 4, 9 has a content of NO less than 5 ppb, in general in urban environments.

The present invention is not limited to the shown and described embodiments but can be varied and amended within the scope of the attached claims.

What is claimed is:

1. A scrubber for eliminating a component from air flowing through the scrubber, comprising a housing (1) having at least one inlet hole (2) and an outlet hole (4) and which is comprising filtering material (6), characterised in that a second outlet hole (9) is provided in the housing (1) at a position situated at a distance from the first outlet hole (4) and any inlet hole (2) so that the air leaving the second outlet hole (9) will have passed at least through a depth of the filtering material (6) substantially corresponding to the depth of the filtering material (6) for the air flowing from the inlet hole (2) to the first outlet hole (4).

2. A scrubber according to claim 1, wherein the second outlet hole (9) is intended for a smaller throughput of air than the first outlet hole (4).

3. A scrubber according to claim 1, wherein said at least one inlet holes (2) is provided in the housing (1) in first end side (3) opposite second end side (5) comprising the first outlet hole (4).

4. A scrubber according to claim 3, wherein the second outlet hole (9) is provided at a wall (8) of the housing (1) between the first second end sides (3, 5).

5. A scrubber according to claim 3, wherein no inlet holes are present in the second end side (5) comprising the first outlet hole (4) in the vicinity of the second outlet hole (9) so that the air will flow at least through a depth of the filtering material substantially corresponding to the depth of the filtering material (6) for the air flowing through the first outlet hole (4).

6. A scrubber according claim 1, wherein a non-return valve (11) is provided in the first outlet hole (4).

7. A scrubber according to claim 1, wherein the scrubber is provided for filtering NO.

8. A scrubber according claim 7, wherein the filter material (6) is potassium permanganate $KMnO_4$ or potassium permanganate in combination with a suitable grade of carbon.

9. A scrubber according to claim 7, wherein the scrubber eliminates NO to a level less than 5 ppb.

10. A scrubber according to claim 1, wherein a particle filter (7) is provided inside the housing (1) at least at the inlet holes (2) and at the first and second outlet holes (4,9) in order to stop the filter material (6) to escape from the scrubber.

11. A scrubber according to claim 1, wherein the flow rate through the first outlet hole (4) is about 1–10 l/s and the flow rate through the second outlet hole (9) is about 0,5–50 ml/s.

12. A scrubber according to claim 1, wherein the size of the particles of the filtering material is in the range of 1/8–1/128 of an inch.

13. A scrubber according to claim 12, wherein the size of the particles of the filtering material is in the range of 1/32–1/64 of an inch.

* * * * *